United States Patent
Okamoto et al.

(10) Patent No.: US 6,646,391 B2
(45) Date of Patent: Nov. 11, 2003

(54) LIGHT SOURCE DEVICE OF A DIELECTRIC BARRIER DISCHARGE LAMP

(75) Inventors: Masashi Okamoto, Akashi (JP); Takahiro Hiraoka, Himeji (JP); Toshio Okamoto, Takasago (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/045,057

(22) Filed: Jan. 15, 2002

(65) Prior Publication Data

US 2002/0093295 A1 Jul. 18, 2002

(30) Foreign Application Priority Data

Jan. 15, 2001 (JP) ........................................ 2001-006603

(51) Int. Cl.[7] ............................................... H05B 41/16
(52) U.S. Cl. ...................................... 315/246; 315/250
(58) Field of Search .............................. 315/209 R, 206, 315/246, 248, 254, 256, DIG. 2, DIG. 5; 313/607

(56) References Cited

U.S. PATENT DOCUMENTS

| | | | | |
|---|---|---|---|---|
| 5,343,114 A | * | 8/1994 | Beneking et al. | 313/485 |
| 5,668,443 A | * | 9/1997 | Kawaguchi et al. | 315/169.1 |
| 5,936,358 A | * | 8/1999 | Okamoto et al. | 315/248 |
| 6,084,360 A | * | 7/2000 | Yokokawa et al. | 315/287 |
| 6,130,508 A | * | 10/2000 | Miyazaki et al. | 315/209 R |
| 6,259,214 B1 | * | 7/2001 | Doell et al. | 315/246 |
| 6,445,137 B1 | * | 9/2002 | Okamoto et al. | 315/246 |

FOREIGN PATENT DOCUMENTS

JP          11-233071          2/2001

* cited by examiner

*Primary Examiner*—Don Wong
*Assistant Examiner*—Minh D A
(74) *Attorney, Agent, or Firm*—Nixon Peabody LLP; David S. Safran

(57) ABSTRACT

A light source device for a dielectric barrier discharge lamp including a dielectric barrier discharge lamp having a discharge space, the discharge space being filled with a discharge gas which produces excimers by a dielectric barrier discharge; first and second electrodes, a dielectric positioned between at least one of the first and second electrodes for inducing a discharge in the discharge gas, and a feed device for applying an essentially periodic AC high voltage to the first and second electrodes of the dielectric barrier discharge lamp. The feed device includes a setting mechanism for adjusting both the control frequency of the essentially periodic AC high voltage and the amplitude of the essentially periodic AC high voltage in accordance with a set control frequency.

5 Claims, 8 Drawing Sheets

LIGHT SOURCE DEVICE OF A DIELECTRIC BARRIER DISCHARGE LAMP

BACKGROUND OF THE INVENTION

1. Field of the Invention

The invention relates to a light source device for a dielectric barrier discharge lamp. In particular, the invention relates to a light source device for a dielectric barrier discharge lamp which is used as an ultraviolet (UV) light source for a photochemical reaction, and in which light radiated from excimers formed by the dielectric barrier discharge is used.

2. Description of the Related Art

Conventionally, when controlling light from a light source device of a dielectric barrier discharge lamp, two processes are typically performed, either controlling the voltage applied to the lamp or controlling the frequency of the voltage applied to the lamp. In the process in which the voltage applied to the dielectric barrier discharge lamp is controlled, there is an upper limit with respect to the radiant efficiency of the UV radiation and a lower limit with respect to the uniformity of emission. For example, if a dielectric barrier discharge lamp in which a fluorescing material has been applied to the inside of the discharge vessel is used for purposes of image processing, the region between the these upper and lower limits is narrow. Therefore, adequate light control by this process is not possible.

In the process in which the frequency of the voltage applied to the lamp is controlled, light control is possible in a relatively wide range. There is a disadvantage, however, of reducing emission uniformity when the frequency is reduced and the amount of emission is decreased. In order to avoid this reduction in the uniformity of emission, the voltage applied to the lamp is controlled such that uniformity of emission is ensured in a state in which the emission amount is small. Conversely, when the frequency is raised and the amount of emission is increased there is a disadvantage of reducing the radiant efficiency of the UV radiation.

Japanese Patent Disclosure Document HEI 11-233071 describes a light source device for a dielectric barrier discharge lamp in which a supply means is provided, the supply means being divided into two parts and in which the frequency of the AC voltage and the DC source voltage are controlled. The object of this device is to change the voltage in the area in which reduction of the radiant efficiency of the excimer emission is allowable as a result of the increase of the voltage applied to the lamp. This is performed by uniform irradiation of a body to be irradiated with a large area by several dielectric barrier discharge lamps, with respect to voltage control. In addition, with respect to the frequency setting, the device carries out precision adjustment of the nonuniformity as a result of scattering of the radiant efficiency of the individual lamps by several lamps. In this device, the voltage applied to the lamp and the frequency are controlled without any connection to one another and independently of one another. Moreover, problems with respect to the uniformity of emission and the radiant efficiency in the individual dielectric barrier discharge lamps are neither recognized nor indicated.

The following is a description of problems associated with light control for a light source device of a dielectric barrier discharge lamp. Normally, in a dielectric barrier discharge lamp, an electrical charge forms an electrical field which is moved by a discharge in a discharge space and has been deposited on a dielectric. The effect is used by superposition of this electrical field on an electrical field which is formed by a voltage applied from outside the lamp, the outside voltage necessary for starting the discharge is reduced essentially by half.

In a case, however, in which the period after formation of a discharge and movement of the electrical charge until starting of the next discharge, the voltage applied from the outside to the dielectric barrier discharge lamp is changed, the electrical charge present on the dielectric is moved by electrical conduction of residual plasma in the discharge space after completion of the discharge and neutralized. This phenomenon is inevitable in the light source device of a dielectric barrier discharge lamp with a feed device by which an AC high voltage applied to the dielectric barrier discharge lamp is generated by a step-up transformer. The reason for this is that a step-up transformer cannot produce a strict DC voltage.

Normally, the voltage formed on the secondary side of a step-up transformer has a tendency to be continuously attenuated in the direction to zero voltage. Moreover, the voltage begins with an oscillation at the resonant frequency which is fixed by an inductance of the step-up transformer and the electrostatic capacitance of the dielectric barrier discharge lamp. The voltage is also changed in an oscillating manner by the voltage applied from the outside to the dielectric barrier discharge lamp as a result of the "ringing" phenomenon, when the resonant frequency is higher than the control frequency.

Thus, in a case of reducing the emission amount by a reduction of the control frequency for light control, the time interval of a discharge compared to non-light control increases. Accordingly, the amount of electrical charge increases which is moved by electrical conduction of the residual plasmas of the discharge space after completion of the discharge which is present on the dielectric and is neutralized. The intensifying action of the electrical field which is formed by the electrical charge adhering to the dielectric, with respect to the electrical field which is formed by the voltage applied from outside the lamp, is changed. This means that the discharge intensity for non-light control and for light control changes even if the voltage amplitude of the voltage applied from outside the lamp for non-light control and light control does not change. This situation is described in FIGS. 10, 11(*a*) and 11(*b*).

FIG. 10 shows a schematic of one example of a light source device of a dielectric barrier discharge lamp. This device includes an invertor of a full bridge system. Reference number 1 labels a dielectric barrier discharge lamp to which a chopper voltage generated by switching devices Q91 through Q94 and a step-up transformer T91 is applied. In the switching devices Q91 through Q94, a voltage supplied by a power source US is subjected to gate control by gate voltages Vg1 and Vg2. Thus, a dielectric discharge is carried out.

FIGS. 11(A) and 11(B) each show the voltage waveform on the two ends of the dielectric barrier discharge lamp 1. FIG. 11(B) shows a case in which the control frequencies of the gate voltages Vg1 and Vg2 are made lower than those shown in FIG. 11(A). In this case, the time interval T1 in which the switching devices Q91 through Q94 are in the ON state does not change. With respect to the time interval in which all switching devices Q91 through Q94 are in the OFF state, as shown in FIG. 11(A), there is a short time interval T2a which changes in FIG. 11(B) into a long time interval T2b.

If the voltage of the power source US does not change, the voltage waveforms in the time interval T1 in FIGS. 11(A)

and 11(B) have similar shapes. The amplitude Vp of a lamp voltage Ve shown in FIG. 11(A), therefore, has roughly the same value as that shown in FIG. 11(B). However, Vta shown in FIG. 11(A) and Vtb (Vta is larger than Vtb) shown in FIG. 11(B) label a voltage immediately prior to the lamp voltage Ve becoming negative by the switching devices Q92 and Q93 being turned on in the next half period. This is because in the interval in which all the switching devices Q91 through Q94 are in the OFF state, as a result of the LC resonant phenomenon, the lamp voltage Ve changes due to the electrostatic capacitance of the dielectric barrier discharge lamp 1 and to the inductance on the secondary side of the step-up transformer T91. Thus, in FIGS. 11(A) and 11(B), the interval T2b is larger than the interval T2a, and therefore, the amount of change of the lamp voltage Ve in FIG. 11(B) is greater than that in FIG. 11(A). This means that the electrical charge deposited on the dielectric in FIG. 11(B) according to the amount of voltage which is formed by (voltage Vta−voltage Vtb) has been moved and neutralized more than that in FIG. 11(A). The strength of the discharge which is formed when the switching devices Q92 and Q93 are turned on is less in FIG. 11(B) than in FIG. 11(A).

In FIGS. 11(A) and 11(B), "ringing" is formed in the interval T1 in which the switching devices Q91 through Q94 are in the ON state, as a result of the LC resonance by the electrostatic capacitance of the dielectric barrier discharge lamp 1 and due to the cross inductance of the primary winding and the secondary winding of the step-up transformer T91. Since the cross inductance is typically small, its resonant frequency becomes high. Therefore, in the case in which all the switching devices Q91 through Q94 are turned off in some phase of a state in which the amplitude of this resonance is high, and in which immediately the switching devices Q92 and Q93 are turned on, there are also cases in which, depending upon the phase, the discharge becomes stronger, the lower the frequency is made. This means that by changing the control frequency of the switching devices Q91 to Q94, the discharge intensity changes for non-light control and light control, even if the amplitude of the voltage applied from outside the lamp for non-light control and for light control does not change. When the discharge intensity decreases for non-light control, this change reduces the uniformity of emission and conversely, when the discharge intensity increases for light control, reduces the radiant efficiency. It can, therefore, be understood that in the case of a change of the control frequency for light control, it is necessary to change, and thus, adjust the amplitude of the voltage applied from outside the lamp in conjunction with the control frequency.

SUMMARY OF THE INVENTION

The present invention was devised to eliminate the above-described disadvantages with respect to light control in conventional dielectric barrier discharge lamps. An object of the invention is to devise a light source device of a dielectric barrier discharge lamp in which, for a large emission amount, light control is carried out by accomplishing an optimum state with respect to the uniformity of emission and the radiant efficiency of the UV radiation.

Another object of the invention is to devise a light source device of a dielectric barrier discharge lamp in which, for a small emission amount, the conventional disadvantage of a reduction in the uniformity of emission can be eliminated.

The above objects are achieved in accordance with a first embodiment of the invention by providing a light source device for a dielectric barrier discharge lamp which includes a dielectric barrier discharge lamp having a discharge space filled with a discharge gas which produces excimers by a dielectric barrier discharge and in which there is a dielectric between at least one of the two electrodes by which a discharge is to be induced in the discharge gas; a feed device for applying an essentially periodic AC high voltage to the electrodes of the dielectric barrier discharge lamp, the feed device having a setting mechanism which adjusts both the control frequency of the essentially periodic AC high voltage and the amplitude of the essentially periodic AC high voltage according to the set control frequency.

In a second embodiment of the invention, the feed device includes a power source, a voltage controller for controlling the feed voltage, an invertor which is triggered by the controlled voltage, an invertor switching device driver signal generating mechanism which produces signals for driving the switching devices for the inverter, a voltage control switching device driver signal generating mechanism which produces a signal for driving the switching device for voltage control, and a setting mechanism which adjusts both the control frequency of the essentially periodic AC high voltage and the amplitude of the essentially periodic AC high voltage according to the set control frequency. With respect to the invertor switching device driver signal generating mechanism, the setting mechanism outputs a set invertor control frequency signal. By the signals for driving the switching devices for the inverter, which outputs the invertor switching device driver signal generating mechanism, drives the invertor with the set control frequency. Moreover, with respect to the voltage control switching device driver signal generating mechanism, outputs a voltage setting signal. By the voltage control switching device driver signal, which the voltage control switching device driver signal generating mechanism outputs, adjusts the amplitude of the essentially periodic AC high voltage output by the voltage control mechanism in conjunction with the set control frequency.

In a third embodiment of the invention, the object is achieved similarly to that of the second embodiment, however, the setting mechanism includes a look-up table which outputs the correct data of a voltage setting signal, the data of the invertor control frequency setting signal being called addresses.

In a fourth embodiment of the invention, the object is achieved in providing a setting mechanism that, as the control frequency drops, adjusts the voltage amplitude such that voltage amplitude increases when the discharge intensity of the dielectric barrier discharge lamp decreases.

DETAILED DESCRIPTION OF THE INVENTION

Figure 1:
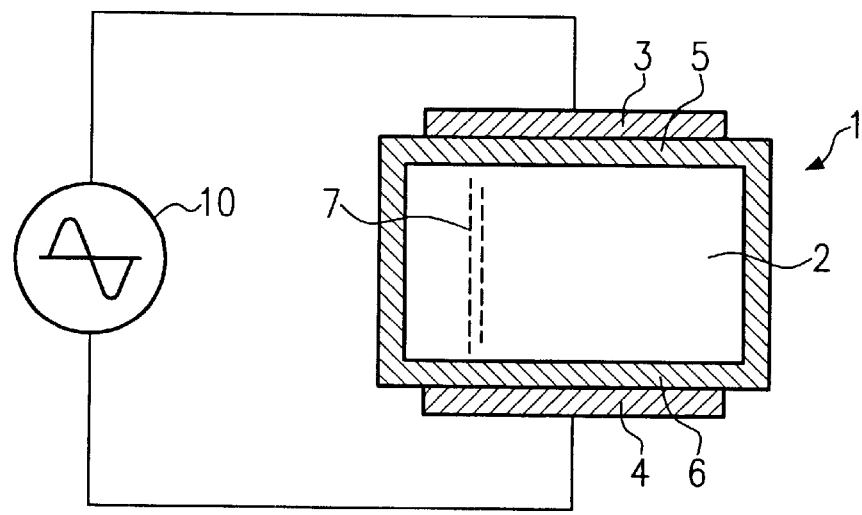
FIG. 1 shows a schematic of the light source device of a dielectric barrier discharge lamp in accordance with the invention.

The invention is further described below using the embodiments shown in FIGS. 1 through 9. FIG. 1 is a schematic of the light source device of a dielectric barrier discharge lamp in accordance with the invention. A dielectric barrier discharge lamp 1 is provided in which on the outside wall of a discharge vessel including dielectrics 5, 6 of quartz glass or the like are opposing electrodes 3, 4. When an AC high voltage from a feed device 10 is applied between the electrodes 3, 4, discharge plasmas 7 are produced in the discharge plasma space 2.

Figure 2:
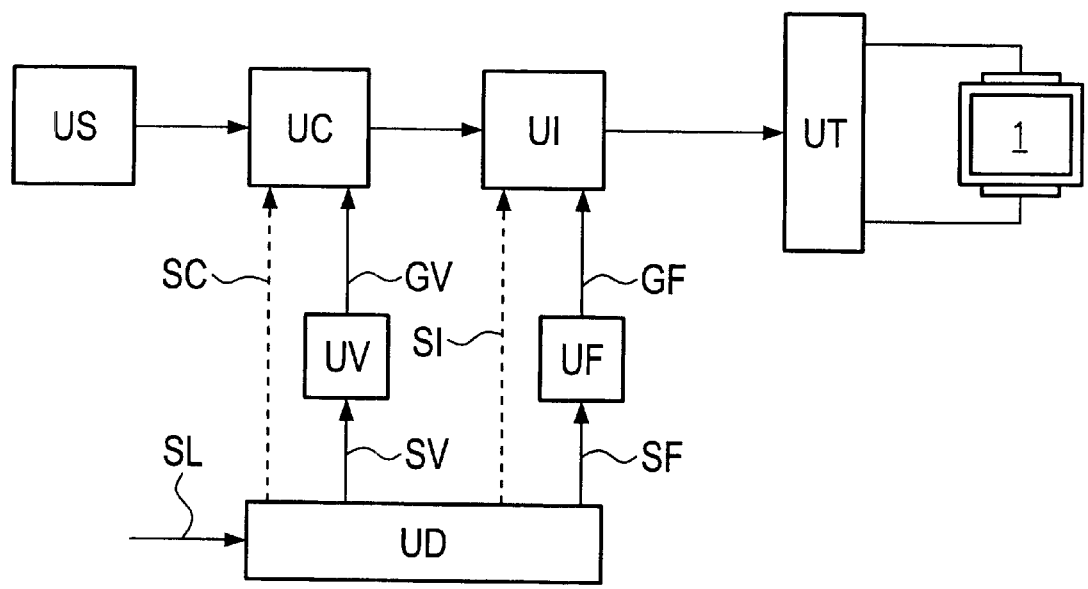
FIG. 2 shows a block diagram of the arrangement of the light source device of a dielectric barrier discharge lamp in accordance with the invention.

FIG. 2 shows a block diagram of the arrangement of a light source device of a dielectric barrier discharge lamp in accordance with the invention. The voltage from a power source US is controlled by way of a voltage control circuit UC with an output which is converted into an alternating current by way of an invertor circuit UI. The output of the invertor circuit UI is subjected to a voltage increase by way of a boosting circuit UT using a step-up transformer or the like and is applied to the dielectric barrier discharge lamp 1. A light control circuit UD follows a light control signal SL and with respect to the invertor switching device driver signal generating circuit UF, sets the control frequency of the invertor by an invertor control frequency adjustment signal SF. With respect to a voltage control switching device driver signal generating circuit UW, the light control circuit UD adjusts the driving conditions of the switching device of the voltage control circuit UC by a voltage adjustment signal SV. The light control circuit UD can, therefore, set the control frequency of an essentially periodic AC high voltage, and also corresponds to a setting means in which the amplitude of the essentially periodic AC high voltage is adjusted according to a set control frequency.

The invertor switching device driver signal generating circuit UF drives the switching devices of the invertor circuit UI by invertor switching device driver signals GF. The voltage control switching device driver signal generating circuit UV drives the switching device of the voltage control circuit UC by the voltage control switching device driver signal generating signal GV. By way of this arrangement of the light source device of a dielectric barrier discharge lamp, a light source device of a dielectric barrier discharge lamp can be implemented in which the light control signal SL is followed, the frequency of the invertor circuit UI and the corresponding voltage applied to the dielectric barrier discharge lamp 1 are chosen and set, wherein for a large emission amount the expected light control is carried out by accomplishing an optimum state with respect to the uniformity of emission and the radiant efficiency of UV radiation. For a small emission amount, the conventional disadvantage of a reduction in the uniformity of emission is also eliminated. More specifically, a reduction in the uniformity of emission and a reduction of the radiant efficiency of the UV radiation can be prevented as a result of the measure that, in the case of a reduction of the discharge intensity, due to the motion of the electrical charge present on the dielectric for light control, the amplitude of the voltage applied from outside the lamp must be increased by a certain amount. Conversely, in the case of an increase in the discharge intensity for light control, the amplitude of the voltage applied from outside the lamp must be reduced by a certain amount.

Furthermore, not only in light control, but also in luminous operation, by reducing the control frequency, the voltage amplitude is set such that it increases in the case of a reduction in the discharge intensity of the dielectric barrier discharge lamp. In this way, a reduction in the uniformity of emission and a reduction in the radiant efficiency of the UV radiation can be prevented.

Figure 11A:
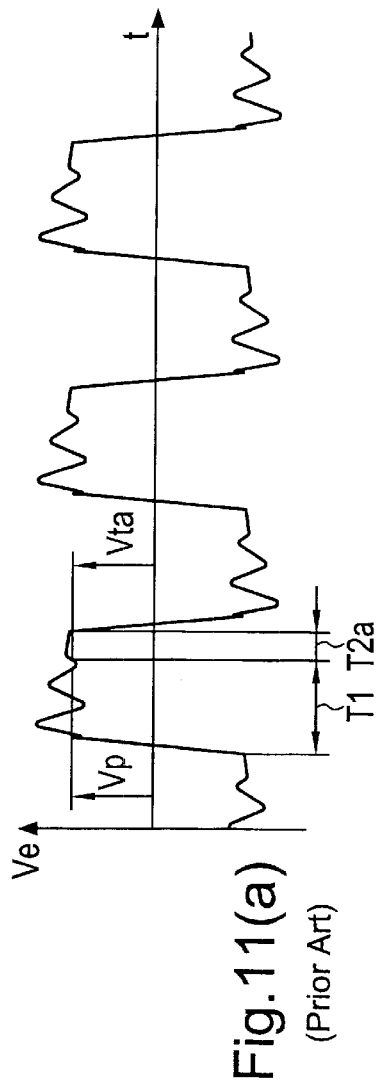
FIGS. 11(A) and 11(B) each show a schematic of the voltage waveform of a dielectric barrier discharge lamp in the case of a different control frequency of the gate voltages Vg1 and Vg2.
Figure 11B:
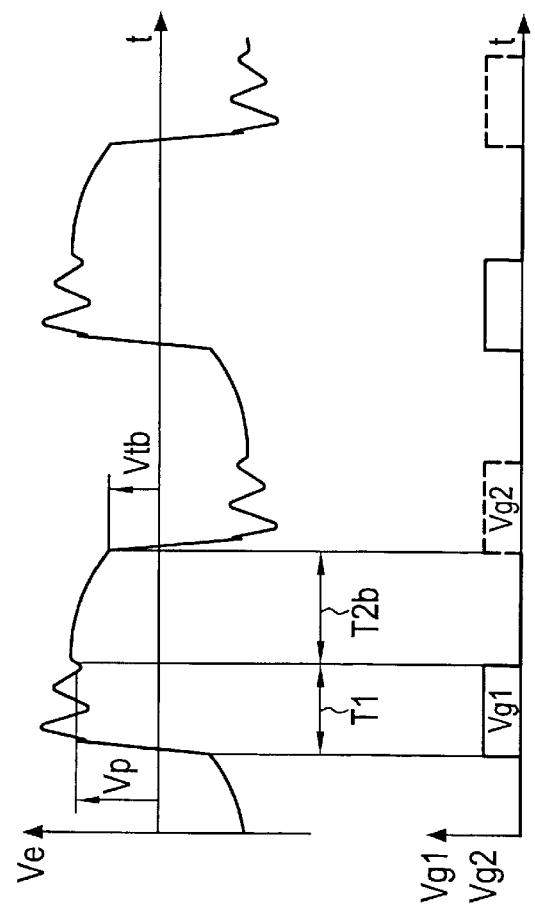

If, as a result of cross inductance or the like of the primary winding and the secondary winding of the step-up transformer UT which is used for a supplementary circuit, the waveform of the voltage applied to the dielectric barrier discharge lamp 1 contains ringing and a surge and the like, a value can be imagined for the voltage amplitude, the value being obtained by elimination of the oscillation component, of the maximum and of the minimum which have occurred thereby. For example, in the interval in which ringing is formed, as is shown in FIGS. 11(A) and 11(B), the center line of the oscillation of it can be assumed, the peak value thereof representing the voltage amplitude Vp. The reason for this is that these components, such as ringing, a surge and the like cannot be controlled nor set from the outside.

In the light source device of a dielectric barrier discharge lamp in accordance with the invention, a circuit arrangement can be undertaken in which the power source US and the voltage control circuit UC operate as a single part. Or, a circuit arrangement can be undertaken in which the voltage control circuit UC and the invertor circuit UI operate as a single part. Or, a circuit arrangement can be undertaken in which the voltage control switching device driver signal generating circuit UV and the invertor switching device driver signal generating circuit UF operate as a single part. Or, a circuit arrangement can be undertaken in which the voltage control switching device driver signal generating circuit UV, the invertor switching device driver signal generating circuit UF and the light control circuit UD operate as a single part. Furthermore, a circuit arrangement can be undertaken if it has the same functions, even if it is not clearly divided into the circuit arrangement shown using the block diagram in FIG. 2.

Figure 3:
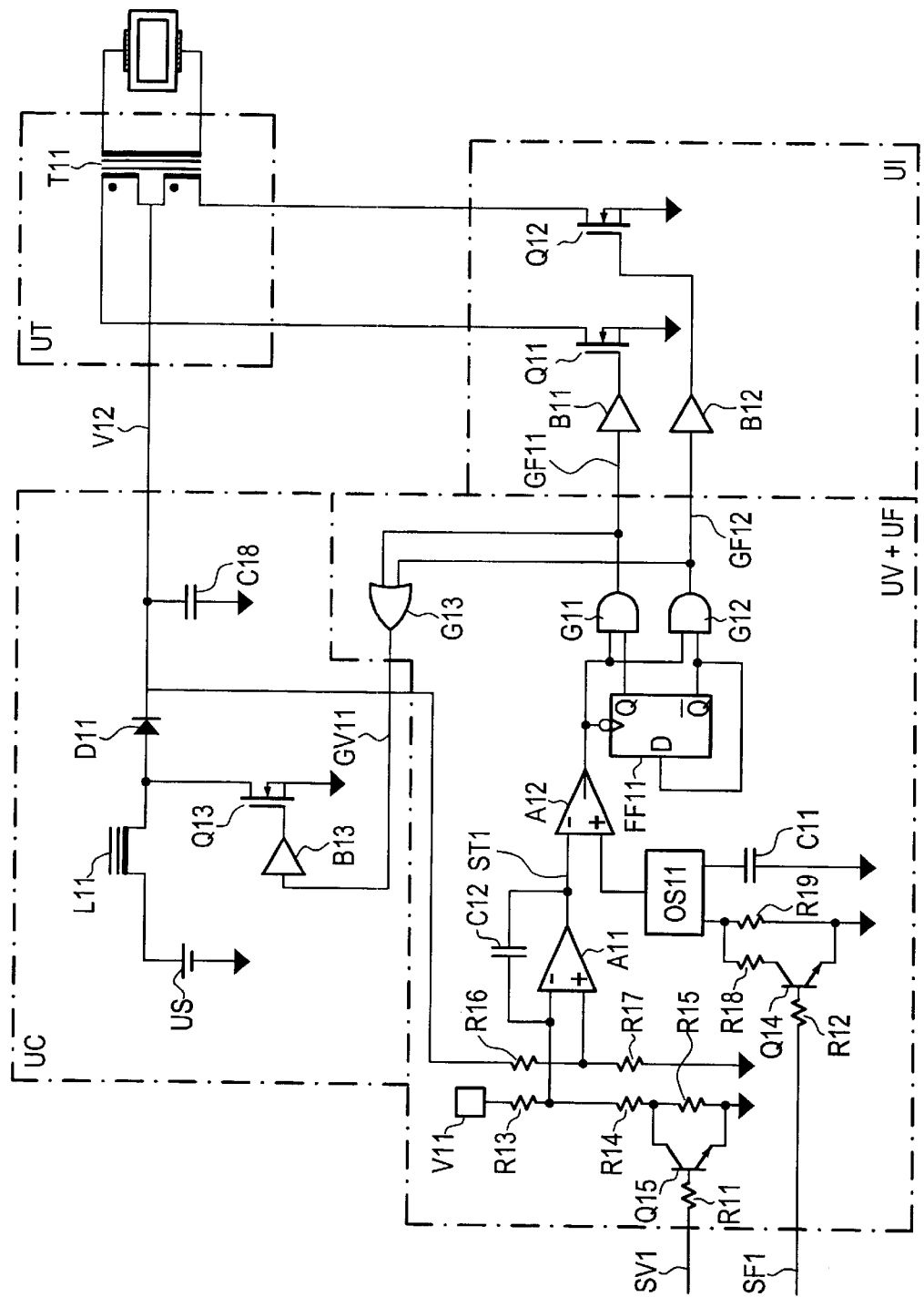
FIG. 3 shows a schematic of a specific circuit example of the light source device of a dielectric barrier discharge lamp as shown in FIG. 2.

A first embodiment of the invention is described below using FIG. 3 and FIG. 6. FIG. 3 shows a schematic of one example of the specific arrangement of the light source device of a dielectric barrier discharge lamp shown in FIG. 2, whereby in FIG. 3, there is a circuit arrangement which has no clear division into the switching device driver signal generating circuit UF and the voltage control switching device driver signal generating circuit UV as shown in FIG. 2. The light source device of a dielectric barrier discharge lamp in FIG. 3 includes a feed device using an invertor of the so-called push-pull system, with its main components being the switching devices Q11 and Q12 using FETs or the like and a step-up transformer T11. FIG. 3 does not show the light control circuit UD.

FIGS. 4(A) through 4(F) each show a timing chart of the light source device of a dielectric barrier discharge lamp shown in FIG. 3 for the respective switching device. For this light source device of a dielectric barrier discharge lamp, the invertor control frequency is switched according to a bivalent invertor control frequency adjustment signal SF1 and a bivalent voltage adjustment signal SV1, these signals of the light control circuit UD having been produced according to a bivalent light control signal SL input from the outside, as is shown in FIG. 2. At the same time, the voltage applied to the primary side of the step-up transformer T11 is switched.

As is shown in FIG. 4(A), an oscillator OS11 for producing sawtooth waves oscillates in a period which in conjunction with the CR time constant is fixed by a capacitor C11 and resistors R18, R19. In the case of a large CR time constant, the slope of the voltage rise becomes flat, while for a small CR time constant, the slope becomes large. When the transistor Q14 is in the ON state, the resistor R19 is connected parallel to the resistor R18, by which the oscillation frequency increases. If, conversely, the transistor Q14 is in the OFF state, the resistor R19 is cut off by this oscillatory circuit, by which the oscillation frequency decreases. The output signal of the oscillator OS11 for producing sawtooth waves is input into a comparator A12 and compared to a threshold signal ST1.

As is shown in FIG. 4(B), in the time during which the output voltage of the oscillator OS11 for producing sawtooth waves is higher than the threshold value signal ST1, the comparator A12 outputs signals with a high level, while conversely, in the time during which the output voltage of the oscillator OS11 for producing sawtooth waves is lower than the threshold value signal ST1, it outputs signals with a low level. As shown in FIGS. 4(C) and 4(D), the output signals of the comparator A12 are input into the inverting flip-flop FF11 as clock signals. In this way, the inverting flip-flop FF11 for each falling of the output signal of the comparator A12 reverses its state. As shown in FIGS. 4(E) and 4(F), the output of the positive logic and the output of the negative logic of the inverting flip-flop FF11 are each input into the AND gates G11 and G12.

Furthermore, the output signals of the comparator A12 are jointly input into the AND gates G11 and G12. In this way, signals are output from the AND gates G11, G12 as invertor switching device driver signals GF11, GF12, for which signals with a high level with a given duration appear alternately. The invertor switching device driver signals GF11, GF12 drive the gates of the switching devices Q11, Q12 via the buffer circuits B11, B112. The switching devices Q11, Q12 drive the respective primary winding of the step-up transformer T11 and form a push-pull invertor. The input power source V12 for the step-up transformer T11 increases and by way of a boosting chopper as the voltage control circuit UC, produces the voltage of the power source US, the voltage control circuit UC comprising mainly of a switching device Q13, using FETs or the like, a coil L11, a diode D11 and a smoothing capacitor C13. Reference GV11 labels a voltage control switching device driver signal which is generated by logic addition of the invertor switching device driver signals GF11, GF12 at an OR gate G13, and which drives the gate of the switching device Q13 via a buffer B13.

The output voltage V12 of the booster chopper is subjected to voltage division by the resistors R16, R17 and input into the noninverting input terminal of an operational amplifier A11. On the other hand, the reference voltage V11 is subjected to voltage division by resistors R13, R14, and R15 and input into the inverting input terminal of the operational amplifier A11. However, the resistor R15 is series connected to the resistor R14 when the transistor Q15 is in the OFF state. Thus, the voltage division ratio increases. If, conversely, the transistor Q15 is in the ON state, the resistor R15 is shorted, by which the voltage division ratio decreases. Since a capacitor C12 is connected between the output terminal and the inverting input terminal of the operational amplifier A11, it is operated as an integration circuit. The output signal of the operational amplifier A11 is used as the threshold signal ST1 which is compared by the comparator A12 to the output voltage of the oscillator OS11 for producing the sawtooth waves.

This arrangement increases the output ST1 of the operational amplifier A11 when the voltage of the noninverting input terminal of the operational amplifier A11, which is the signal which corresponds to the voltage V12 and which is sent to the inverter, is higher than the voltage of the inverting input terminal of the operational amplifier A11, which is a signal which corresponds to the setpoint of the voltage which is sent to the inverter. Therefore, the interval in which a high level results from its comparison to the output voltage of the oscillator OS11 for producing the sawtooth waves becomes shorter. Accordingly, the duty factor of the voltage control switching device driver signal GV11 becomes smaller and the capacity of the booster chopper becomes less. The output of the booster chopper, i.e., the voltage V12 supplied to the inverter, becomes lower. As a result, control with feedback can be carried out such that the voltage V12 supplied to the invertor is maintained at the setpoint.

Since the dielectric barrier discharge lamp 1 is connected to the secondary side of the transformer T11 with the primary side driven by this inverter, control with feedback is carried out such that the voltage applied to the lamp, i.e., its voltage amplitude, maintains its setpoint. When the bivalent invertor control frequency adjustment signal SF1 is at the high level, the transistor Q14 is turned on via a resistor R12, resulting in a state in which the oscillation frequency of the oscillator OS11 for producing the sawtooth waves is high. If, conversely, the invertor control frequency setting signal SF1 is at a low level, a state is reached in which the oscillation frequency is low.

If the value of the capacitor C11 is established beforehand, the oscillation frequency in the state in which the oscillation frequency is low is fixed by the resistor R19. Since the oscillation frequency in the state in which the oscillation frequency is high is fixed both by the resistor R18 and also by the resistor R19, the oscillation frequency in the state of a high oscillation frequency and the oscillation frequency in the state of a low oscillation frequency each can be set individually. In other words, the control frequency in a low state and the control frequency in a high state can be set individually.

When the bivalent voltage adjustment signal SV1 is at the high level, the transistor Q15 is turned on via a resistor R11. The voltage division ratio to the reference voltage V11 becomes less, and the voltage for the inverting input terminal of the operational amplifier A11 becomes lower. A state is reached in which the voltage V12 supplied to the invertor is low and the amplitude of the AC high voltage applied to the dielectric barrier discharge lamp 1 is low. If, conversely, the bivalent voltage adjustment signal SV1 is at a low level, a state is achieved in which the amplitude of the AC high voltage applied to the dielectric barrier discharge lamp 1 is high.

When the values of the resistors R13, R16 and R17 are established beforehand, the voltage amplitude in the state in which the amplitude of the AC high voltage applied to the dielectric barrier discharge lamp 1 is low is fixed by the resistor R14. Since the voltage amplitude in the state in which the voltage amplitude of the AC high voltage applied to the dielectric barrier discharge lamp 1 is high is fixed both by the resistor R14 and also by the resistor R15, the voltage amplitude in the state of a low voltage amplitude and the voltage amplitude in the state of a high voltage amplitude of the AC high voltage applied to the dielectric barrier discharge lamp 1 can be set individually. As was described above, the values of the resistors R14, R18 and R19 are fixed in control for light control in the following manner in the case in which light control is carried out by eliminating the phenomenon that the intensity of the discharge which forms when the switching devices of the invertor are turned on is less at a low frequency than at a high frequency.

If it is assumed that the emission amount at a high level of the bivalent light control signal SL is increased, in the light control circuit UD the bivalent invertor control frequency adjustment signal SF1 is set to a high level and the bivalent voltage adjustment signal SV1 is set to a high level so that at a high oscillation frequency and a low voltage supplied to the inverter, optimum conditions with respect to the uniformity of emission and the radiant efficiency of the UV radiation are met. If, conversely, it is assumed that the amount of emission at a low level of the bivalent light control signal S1 is reduced, the values of the resistors R14, R15 and R19 are set such that in the light control circuit UD the bivalent invertor control frequency adjustment signal SF1 is set to a low level and the bivalent voltage adjustment signal SV1 is set to a low level so that at a low oscillation frequency and a high voltage supplied to the inverter. Thus, optimum conditions with respect to the uniformity of emission and the radiant efficiency of the UW radiation are met.

By this arrangement of the feed device of a light source device of a dielectric barrier discharge lamp, a light source device of a dielectric barrier discharge lamp can be implemented in which the light control signal SL is followed. Also, a light source device of a dielectric barrier discharge lamp can be implemented in which the invertor control frequency adjustment signal SF1 and the voltage adjustment signal SV1 which the light control circuit UD has produced are followed. A light source device of a dielectric barrier discharge lamp can be implemented in which the invertor control frequency and the voltage amplitude of the dielectric barrier discharge lamp 1 are switched. Moreover, a light source device of a dielectric barrier discharge lamp can be implemented in which, for a large amount of emission, the expected light control is carried out by accomplishing an optimum state with respect to the uniformity of emission and the radiant efficiency of the UV radiation. Last, a light source device of a dielectric barrier discharge lamp can be implemented in which, at a small emission amount, the disadvantage of a reduction of the uniformity of emission is also prevented.

Furthermore, by the following measure an optimum amplitude of the voltage supplied to the inverter, i.e., an optimum amplitude of the AC high voltage applied to the dielectric barrier discharge lamp 1, can also be set in the case in which the voltage applied from the outside to the dielectric barrier discharge lamp 1 is changed by the above-described ringing phenomenon in an oscillating manner. Under the conditions that for light control the control frequency is decreased and the emission amount is reduced, the amount of increase of the period as a result of the drop in the control frequency and the amount of change of the phase of the oscillation which corresponds to this amount of increase due to the ringing phenomenon are evaluated in a suitable manner. In this way, it is decided which level, whether a high level or a low level, of the bivalent voltage adjustment signal SV1 is suited. Thus, the values of the resistors R14, R15 are adjusted.

Figure 5:
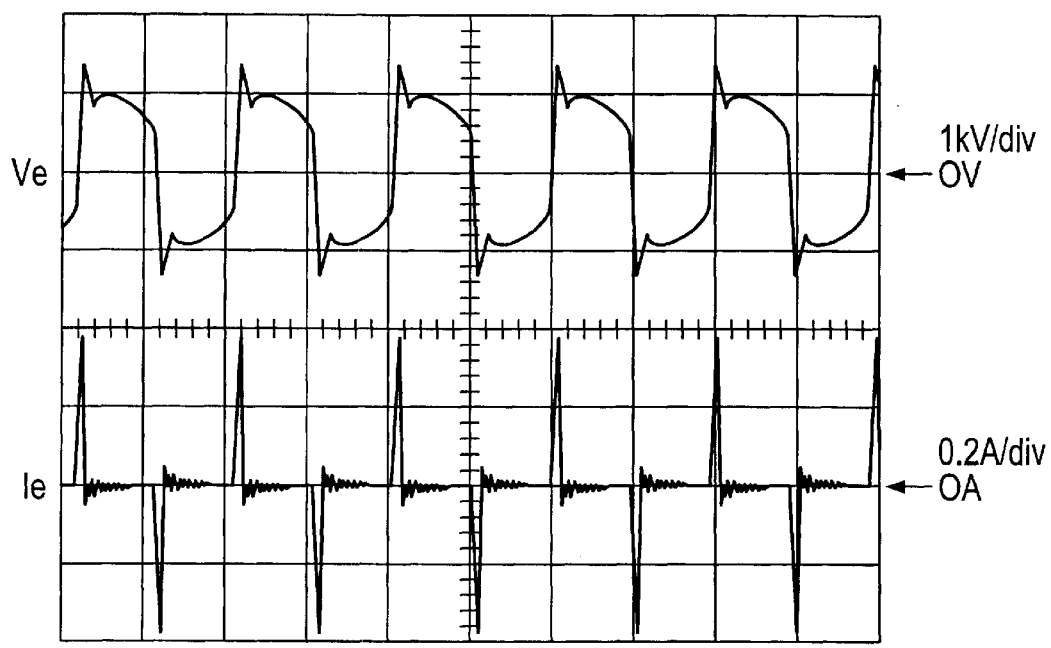
FIG. 5 shows a schematic of the lamp voltage waveform Ve and the lamp current waveform Ie in non-light control for a rare gas fluorescent lamp device which is a dielectric barrier discharge lamp device in accordance with the first embodiment of the invention.
Figure 6:
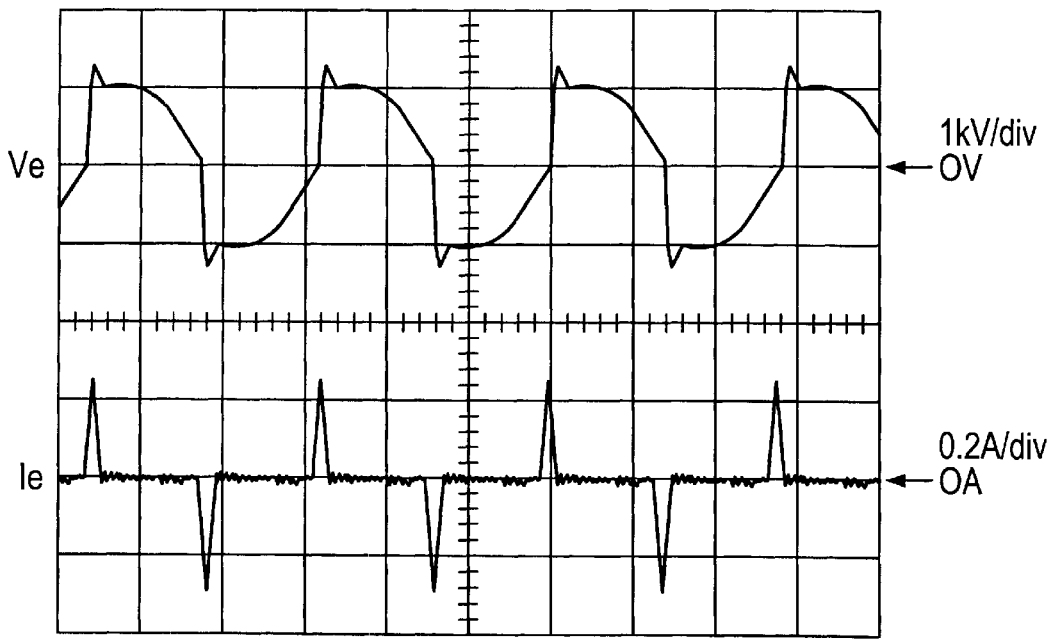
FIG. 6 shows a schematic of the lamp voltage waveform Ve and the lamp current waveform Ie in light control for a rare gas fluorescent lamp device which is a dielectric barrier discharge lamp device in accordance with the first embodiment of the invention.

FIGS. 5 and 6 each show in a schematic the lamp voltage waveform Ve and the lamp current waveform Ie for non-light control and light control of a rare gas fluorescent lamp device which is the dielectric barrier discharge lamp in this embodiment. The lamp voltage waveform Ve and the lamp current waveform Ie in the following specification have a control frequency for non-light control of 52.1 kHz and a control frequency for light control of 35.4 kHz. The power source US has 24 V, the turn number of the primary winding of the step-up transformer T11 is 20, the turn number of the secondary winding thereof is 315, the resistor R33 is 5.1 k$\Omega$, the resistor R34 is 5.1 k$\Omega$, and the resistor R35 3.0 k$\Omega$, and the voltage amplitude for non-light control is 930 V and for light control is 1040 V.

In this device which has produced the voltage waveforms shown in FIGS. 5 and 6, pulse widths of the invertor switching device driver signals GF11, GF12 are very small. Therefore, a single wave crest of ringing is formed. The value of the above described voltage amplitude was defined for the voltage waveforms in FIGS. 5 and 6 by the maximum value of the voltage which formed after the sequence on this oscillation wave crest. The reduction in the lamp voltage Ve as a result of the LC resonance phenomenon between the electrostatic capacitance of the above described dielectric barrier discharge lamp 1 and the inductance of the secondary side of the transformer T1 during the time in which both of the invertor switching device driver signals GF11 and GF12 are in the OFF state, in the waveform in FIG. 6 with a low frequency is larger than in the waveform in FIG. 5 with a high frequency. The peak value of the lamp current Ie is, therefore, greater in the waveform in FIG. 5 with a low voltage amplitude Vp than in the waveform in FIG. 6 with a high voltage amplitude Vp. If under the condition of a low frequency, the voltage amplitude Vp has not increased, the difference between the peak values of the lamp current became even greater; with respect to the uniformity of lamp emission this caused a problem. But, by holding roughly at this difference the uniformity of emission was ensured in a given range.

Figure 7:
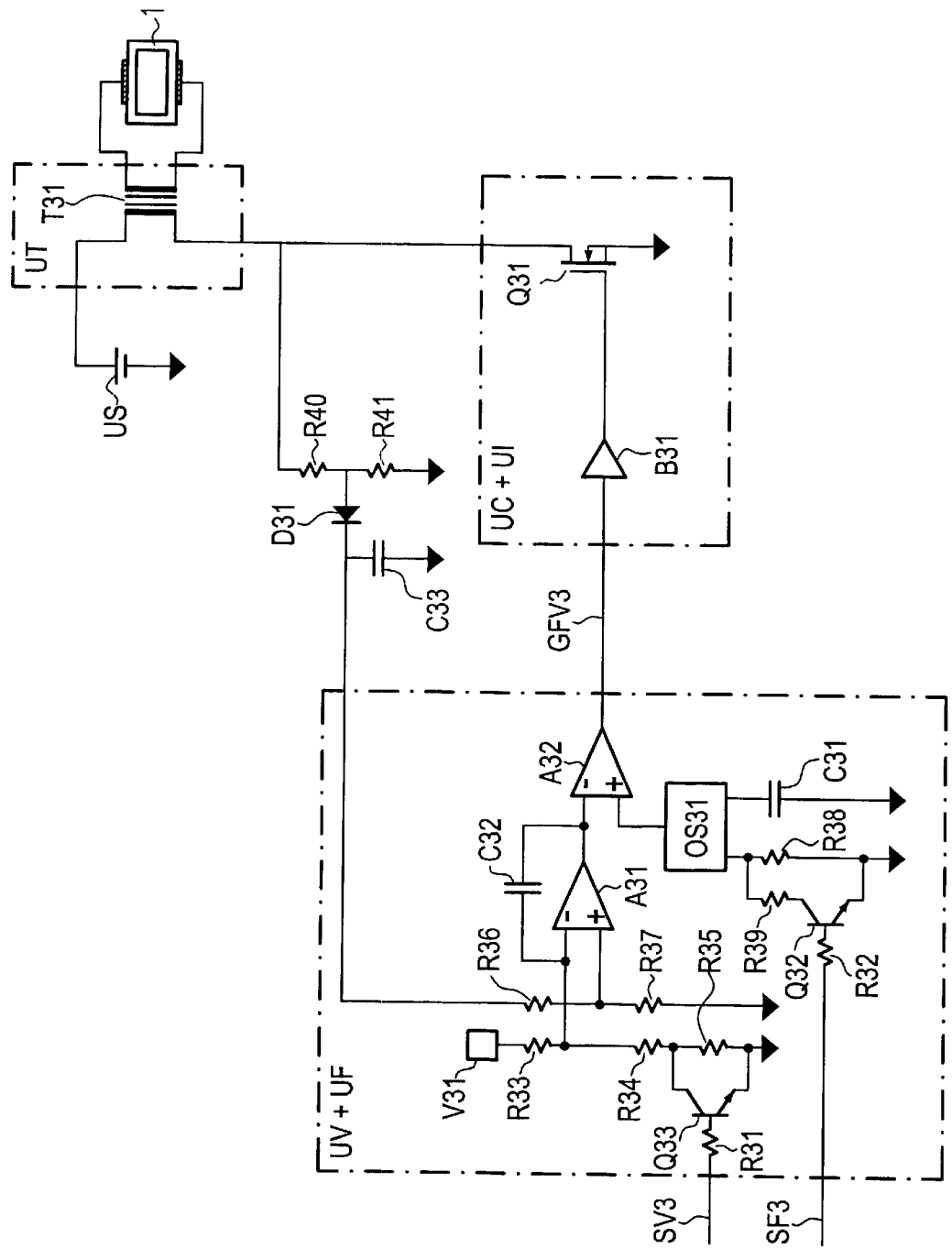
FIG. 7 shows a schematic of another specific circuit of the specific arrangement of the light source device of a dielectric barrier discharge lamp as shown in FIG. 2.

A second embodiment of the invention is described below using FIG. 7, which shows a schematic of another specific circuit example of the light source device of a dielectric barrier discharge lamp shown in FIG. 2. In FIG. 7, this light source device of a dielectric barrier discharge lamp having an arrangement which does not have a clear division into the switching device driver signal generating circuit UF and the voltage control switching device driver signal generating circuit UV. The light source device of the dielectric barrier discharge lamp in FIG. 7 includes a feed device using an invertor of the so-called fly-back system. The light control circuit ULD is not shown in FIG. 7.

In this embodiment, the terminals and the operation of the following components are identical to the first embodiment in FIG. 3. An oscillator OS31 for producing sawtooth waves, an operational amplifier A31, a comparator A32, capacitors C31 and C32, resistors R31, R32, R33, R34, R35, R36, R37, R38, and R39, transistors Q32 and Q33, an invertor control frequency adjustment signal SF3 and a voltage adjustment signal SV3, to those of the oscillator OS11 for producing sawtooth waves, the operational amplifier A11, the comparator A12, capacitors C11 and C12, resistors R11, R12, R13, R14, R15, R16, R17, R18, and R19, transistors Q14 and Q15, an invertor control frequency adjustment signal SF1 and a voltage adjustment signal SV1. During the interval in which the output signal GFV3 of the comparator A32 is at a high level, via a buffer B31 a switching device Q31 is turned on using FETs or the like. In this interval, current flows from the power source US into a transformer T31 in which energy is stored.

When the signal GFV3 reaches a low level, the switching device Q31 is suddenly turned off, releasing the energy stored in the transformer T31 to the secondary side. This yields a high voltage which corresponds to the winding ratio of the transformer T31 and a discharge forms in the lamp. In this embodiment a diode D31, a capacitor C33, and resistors R40 and R41 have the functions of determining the voltage amplitude. In the time in which on the secondary side of the transformer T31 a high voltage forms, on the primary side there is a relatively high voltage which corresponds to the winding ratio, with an essentially similar waveform. By way of suitable voltage division by the resistors R40, R41 and by charging the capacitor C33 via the diode D31, the amplitude of the voltage of the switching device Q31 is fixed in the capacitor C33. Since this voltage correlates with the amplitude of the voltage which has been applied to the lamp, by connecting the latter to the resistor R36 control with feedback is accomplished so that as a result the setpoint of the amplitude of the voltage which has been applied to the lamp is maintained.

As was described above, the function of the invertor control frequency adjustment signal SF3 and of the voltage adjustment signal SF1 is identical to those of the invertor control frequency adjustment signal SF1 and the voltage adjustment signal SV1 in the first embodiment. Therefore, the light source device of a dielectric barrier discharge lamp can likewise be implemented, in which the light control signal SL is followed. Also, the light source device of a dielectric barrier discharge lamp can be implemented in which the invertor control frequency adjustment signal SF3 and the voltage adjustment signal SV3 which have been generated by the light control circuit UD are followed. Thus, the light source device of a dielectric barrier discharge lamp can be implemented in which the invertor control frequency and the voltage amplitude of the dielectric barrier discharge lamp 1 are switched. Moreover, the light source device of a dielectric barrier discharge lamp can be implemented in which, for a large emission amount, the expected light control is carried out by accomplishing an optimum state with respect to the uniformity of emission and the radiant efficiency of UV radiation. Finally, the light source device of a dielectric barrier discharge lamp can be implemented in which, for a small emission amount, the conventional disadvantage of a reduction in the uniformity of emission can also be eliminated.

The relationship to the light source device of the dielectric barrier discharge lamp in this embodiment to the light source device of the dielectric barrier discharge lamp shown in FIG. 2 is described. The important feature is that a single fly-back invertor consisting of the transformer T31 and the switching element Q31 acts both as a voltage control circuit UC and also as an invertor circuit U1 as shown in FIG. 2. This means that the frequency of the output signal GFV3 of the comparator A32 determines the frequency of the ac high voltage applied to the dielectric barrier discharge lamp 1 and the duty factor of the output signal GFV3 of the comparator A32 determines the voltage amplitude of the dielectric barrier discharge lamp 1.

Figure 8:
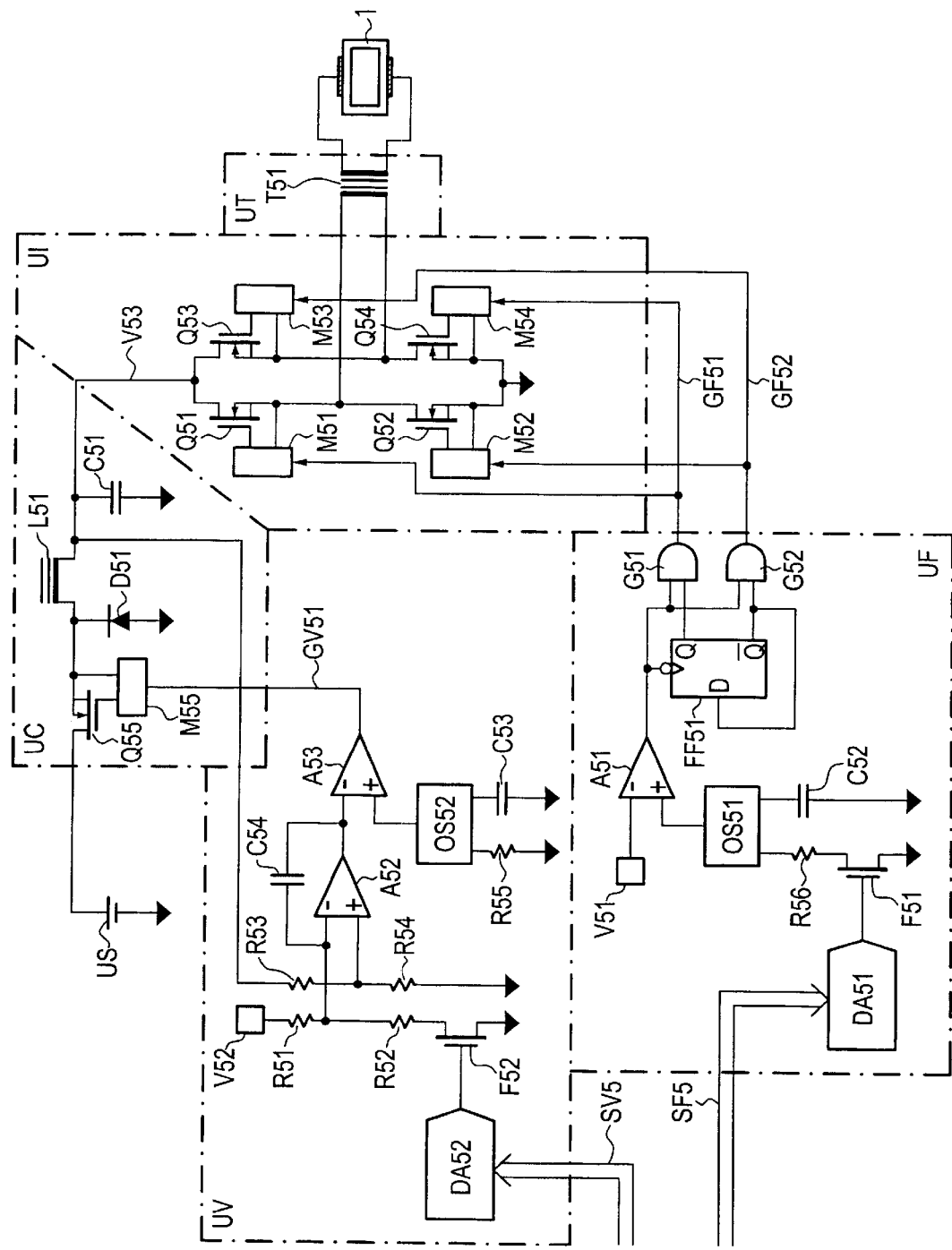
FIG. 8 shows a schematic of a circuit of the light source device of a dielectric barrier discharge lamp as shown in FIG. 2.
Figure 9:
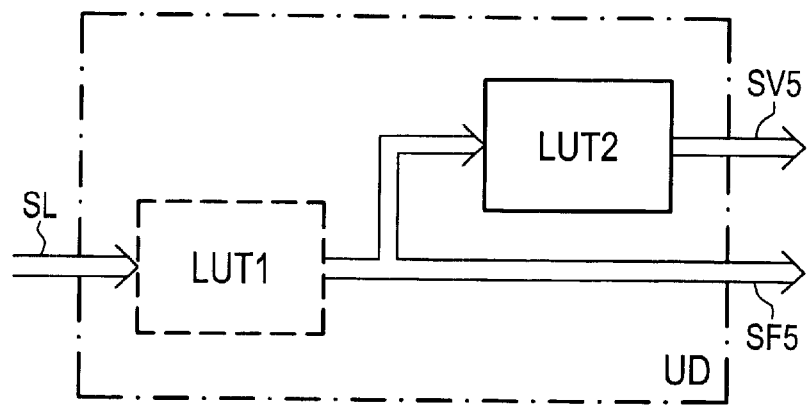
FIG. 9 shows a schematic of a light control circuit UD in the light source device of a dielectric barrier discharge lamp in FIG. 8.
Figure 10:
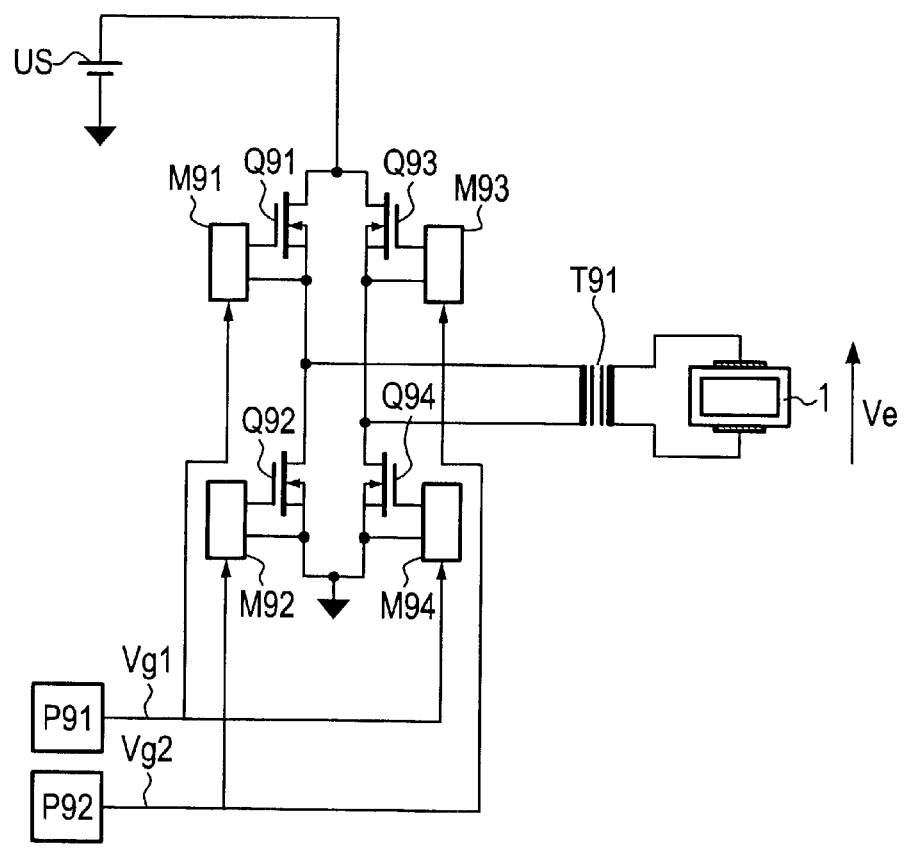
FIG. 10 shows a schematic of one example of the light source device of a dielectric barrier discharge lamp.

A third embodiment of the invention is described below using FIG. 8, which shows a schematic of still another example of the specific circuit arrangement of the light source device of a dielectric barrier discharge lamp shown in FIG. 2. As shown in FIG. 8, this light source device of a dielectric barrier discharge lamp differs from the first embodiment shown in FIG. 3 and the second embodiment shown in FIG. 4. In FIG. 8, there is a circuit arrangement in which the switching device driver signal generating circuit UF and the voltage control switching device driver signal generating circuit UV are formed as separate circuits. The light source device of a dielectric barrier discharge lamp in this embodiment includes a feed device using an invertor of a so-called full bridge system which has switching devices Q51, Q52, Q53 and Q54 of FETs or the like as the main components. FIG. 8 does not show the light control circuit UD.

In this embodiment, an oscillator OSS11 for producing sawtooth waves, a capacitor C52, a comparator A51, a flip-flop FF51 and AND gates G51 and G52 are identical to the oscillator OS11 for producing sawtooth waves, the capacitor C11, the comparator A12, a flip-flop FF11 and AND gates G11 and G12 with the first embodiment shown in FIG. 3. The transistor Q14 in FIG. 3 which is subjected to on and off control by the resistors R18, R19 and the bivalent invertor control frequency adjustment signal SF1 is however replaced in this embodiment by the D/A converter DA51 and a control resistance element F51. The D/A converter DA51 outputs a multistage analog voltage by a resistor R56 and a multivalent invertor control frequency adjustment signal SF5. In this way, the resistance value is changed analogously at the control resistance element F51.

The invertor switching device driver signals GF51, GF52 can, therefore, change the frequency by the invertor control frequency adjustment signal SF5 in several stages and thus the control frequency of the AC high voltage applied to the dielectric barrier discharge lamp 1 in several stages. If, for example, the data length of the invertor control frequency adjustment signal SF5 is 8 bits, the frequency can be changed to the 256th stage. Since a reference voltage V51 is connected to the inverting input terminal of the comparator A51, the duty factor of the invertor switching device drive signals GF51 and GF52 is constant. The input current source V53 for the invertor circuit reduces and generates by means of a voltage reduction chopper as the voltage control circuit UC the voltage of the power source US, the voltage control circuit UC consisting mainly of a switching device Q55 using FET or the like, a coil L51 or the like, a diode D51 and a smoothing capacitor C51.

The reference voltage V52, resistors R51, R52, R53, R54 and R55, the operational amplifier A52, the capacitor C54, the comparator A53, the oscillator OS52 for producing sawtooth waves and the capacitor C53 are identical to the reference voltage V11, resistors R13, R14, R16, and R17, the operational amplifier A11, the capacitor C12, the comparator A12, the oscillator OS11 for producing sawtooth waves, the resistor R19 and the capacitor C11 in FIG. 3. The transistor Q15 in FIG. 3 which is subjected to on and off control by the resistor R15 and the bivalent voltage adjustment signal SV1 is however replaced by a D/A converter DA52 and a control resistance element F52. The D/A converter DA52 outputs a multistage analog voltage by a multivalent voltage adjustment signal SV5. In this way, the resistance value is changed analogously in the control resistance element F52. The input power source V53 for the invertor circuit can, therefore, change its voltage in several stages by the voltage adjustment signal SV5, and thus, the amplitude of the AC high voltage applied to the dielectric barrier discharge lamp 1 in several stages. If, for example, the data length of the voltage adjustment signal SV5 is 8 bits, the voltage amplitude of the dielectric barrier discharge lamp 1 can be changed to the 256th stage.

In FIG. 3, the time constant resistor to be connected to the oscillator OS11 for producing sawtooth waves can be changed by way of the transistor Q14. In this embodiment, the time constant resistor to be connected to the oscillator OS52 for producing the sawtooth waves is, however, changed into a simple resistor R55. The frequency of the voltage control switching device driver signal GV51 is constant. The advantage due to enabling multistage adjustment of the frequency is that multistage light control can be exercised. When the bit number of the data length of the invertor control frequency adjustment signal SF5 is increased, in practice continuous light control is enabled. The light control signal SL can also be regarded as multistage digital data and it can be used unchanged to produce the invertor control frequency adjustment signal SF5 in the simplest manner. The advantage of enabling multistage adjustment of the amplitude of the AC high voltage applied to the dielectric barrier discharge lamp 1 is that the voltage amplitude of the dielectric barrier discharge lamp 1 can be adjusted according to the set frequency in a precision, correct manner when multistage light control is carried out by changing the frequency.

FIGS. 11(A) and 11(B) each show in a schematic one example of the light control circuit UD which is not shown in FIG. 8 for the light source device of a dielectric barrier discharge lamp. In the case of complicated light control, by the input of the data of the invertor control frequency adjustment signal SF5 shown using this light control circuit UD, a look-up table LUT2 can be implemented as addresses using a digital memory such as RAM, ROM or the like, the digital memory storing data such that the correct data of the voltage adjustment signal SV5 are output. If in the case in which the light control signal SL is used unchanged as the invertor control frequency adjustment signal SF5, there is no desirable relation between the data value of the light control signal SL and the emission amount. And if the disadvantage arises that graphic display is not linear, in which, for example, the X-axis SL and the Y-axis plot the emission amount and in which the relation between the two is plotted, as in the above described manner by inputting the data of the light control signal SL as addresses by way of a look-up table LUT1 using a digital memory such as RAM, ROM or the like, the relation between the two can be corrected, the digital memory storing data such that the correct data of the invertor control frequency adjustment signal SF5 are output.

Furthermore, a computer which reads the light control signal SL and based on a program generates the data of the invertor control frequency adjustment signal SF5 and the data of the voltage adjustment signal SV5 can be installed in the light control circuit UD. Here the data of the voltage adjustment signal SV5 with respect to the data of the invertor control frequency adjustment signal SF5 are not fixed, but the data of the voltage adjustment signal SV5 are automatically established based on the results of measurements of the lamp voltage waveform, the lamp emission amount and the emission amount distribution by a feedback device. Multistage or, in practice, continuous light control can be exercised by the arrangement in this embodiment. Thus, the light source device of a dielectric barrier discharge lamp can be implemented in which in the light control region for a large emission amount the expected light control can be carried out by accomplishing an optimum state with respect to the uniformity of emission and the radiant efficiency of UV radiation, and in which for a small emission amount the conventional disadvantage of a reduction in the uniformity of emission can also be eliminated.

In the embodiment shown in FIG. 8, an application of the control resistance element F51 for changing the CR time constant was described. This was, however, suitably chosen in conjunction with the other embodiments only to facilitate the description. Any other means can be used to the extent they can electrically change the oscillation frequency. For example, a special VCO-voltage controlled oscillator can be used. Furthermore, an application of the control resistance element F52 for changing the power of the booster circuit is described. Here any other means can likewise be used if they can electrically change the power of the boosting circuit. For example, by using a D/A converter of the multiplication type the desired function can be achieved very easily.

In the respective above-described embodiment, invertor circuit UI using the push-pull system, the fly-back system and the full bridge system were shown. But an invertor of a half bridge system or of other system can also be easily used. In the first embodiment a version using a booster chopper was shown as the voltage control circuit UC. However, a version using a voltage control means of another type, such as a voltage reduction chopper, a dropper or the like is also possible. In the second embodiment a version using a booster chopper with a function assumed by an invertor of a fly-back system was shown as the voltage control circuit UC. However, a voltage control means, such as a voltage reduction chopper, a dropper or the like can also be added. In the third embodiment a version using a voltage reduction chopper was shown as the voltage control circuit UC. However, a version using a voltage control means of another type, such as a booster chopper, a dropper or the like is also possible.

In the first, second and third embodiments, a special function for control of turning the lamp on or off was not added. The reason for this is to simply avoid complicating the specification by adding material which is not substantive for the explanation of the invention. For example, as shown in FIG. 2, a voltage control circuit stop signal SC can be input into the voltage control circuit UC, and, on this basis, the gate signal of the switching device of the chopper circuit can be forcibly rendered inactive, or, by inputting an invertor circuit stop signal S1 into the invertor circuit U1, the gate signal of the switching device of the chopper circuit can be forcibly rendered inactive.

It is likewise desirable to arrange fuses for safety, a noise filter, a power source bridging capacitor, furthermore an overcurrent protective circuit, a overvoltage protective circuit and the like in a suitable manner. The other details of the circuit operation described in the above described embodiments, for example, the polarity of the signals, the specific choice, the specific insertion and omission of switching devices or concepts such as changes and the like based on facilitation of the procurement of components and for economic reasons of course are optionally carried out in the practice of building the device. The above described concepts contain complete or partial use of the comparator A12 and the oscillator OS11 for producing sawtooth waves as circuit components in the first embodiment by examining a commercial integrated circuit, for example TL494 from Texas Instruments, $\mu$PC494 from Nippon Denki Kabushiki Kaisha or the like.

The excellent action of the light source device of a dielectric barrier discharge lamp in accordance with the invention is developed effectively regardless of how the light generated by the dielectric barrier discharge lamp is used. Including the case in which on the inside and outside of the lamp bulb housing layers of fluorescent bodies are formed, it is for example likewise effective in an application in which a fluorescing body is caused to emit by the resulting UV radiation.

In the invention described in accordance with an embodiment of the invention, the feed device has a setting means which can adjust the control frequency of the essentially periodic AC high voltage and which moreover can adjust the voltage amplitude of the essentially periodic AC high voltage according to the above described adjusted control frequency. Therefore, for a large emission amount, the expected light control can be exercised by accomplishing an optimum state with respect to the uniformity of emission and the radiant efficiency of UV radiation, and in which for a small emission amount the conventional disadvantage of a reduction in the uniformity of emission can also be eliminated.

In addition, the feed device may include a power source, a voltage controller for controlling the feed voltage, an invertor which is triggered by the controlled voltage, an invertor switching device driver signal generating means which produces signals for driving the switching devices for the inverter, a voltage control switching device driver signal generating means which produces a signal for driving the switching device for voltage control, and the above described setting means. With respect to the above described invertor switching device driver signal generating means, the setting means outputs a set invertor control frequency signal. By the signals for driving the switching devices for the inverter, which outputs the invertor switching device driver signal generating means, drives the invertor with the set control frequency. Moreover, with respect to the voltage control switching device driver signal generating means, outputs a voltage setting signal. By the voltage control switching device driver signal, which the voltage control switching device driver signal generating means outputs, adjusts the amplitude of the essentially periodic AC high voltage output by the voltage control means in conjunction with the set control frequency. In this way, the above described action of the first embodiment can be easily accomplished.

Moreover, the setting means may include a look-up table which can output correct data of the voltage adjustment signal, the data of the invertor control frequency adjustment signal being called addresses. Therefore, the amplitude of the high voltage applied to the dielectric barrier discharge lamp can be finely adjusted to the correct value according to the set invertor control frequency when multistage light control is carried out by changing the invertor control frequency.

Figure 4:
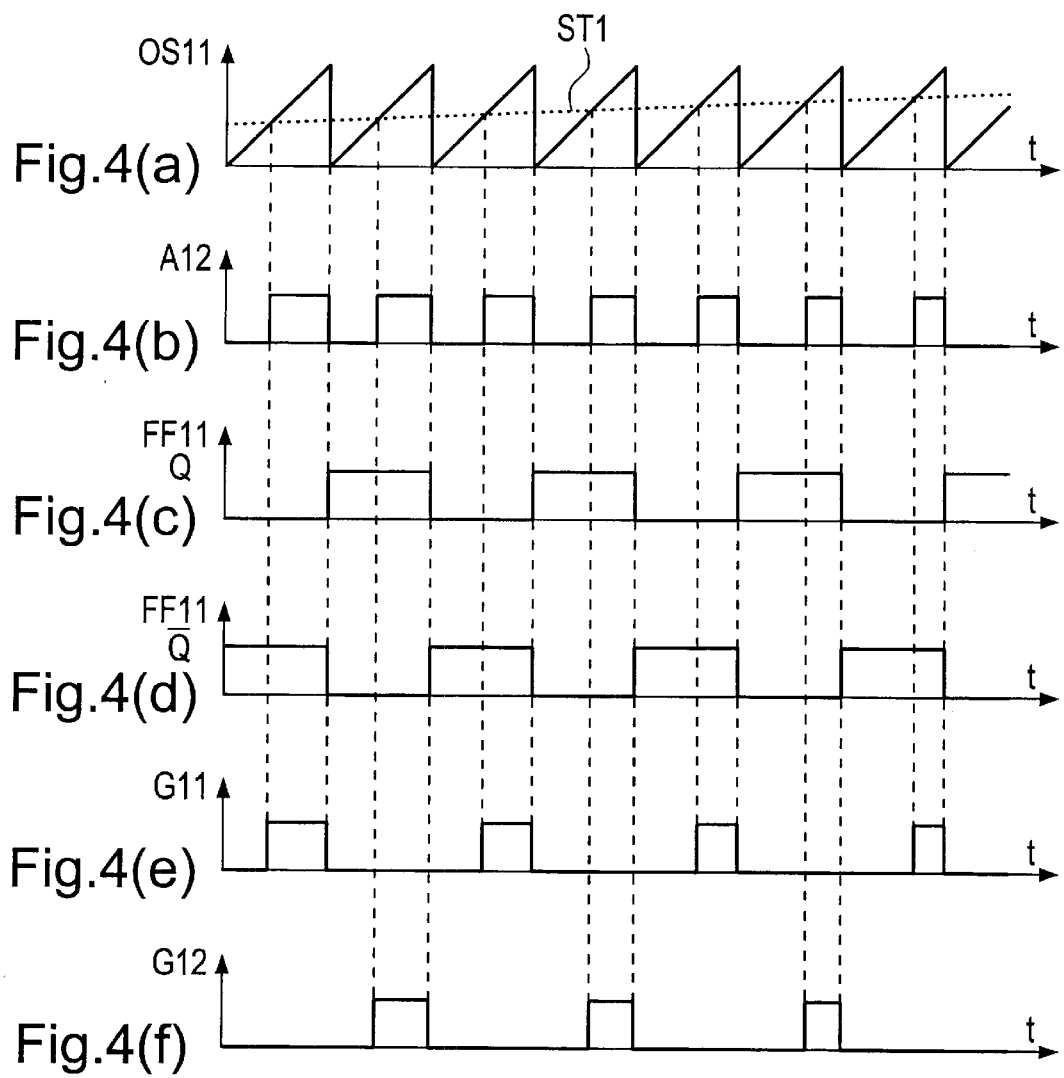
FIGS. 4(A)–(F) each show a timing chart of the light source device of a dielectric barrier discharge lamp as shown in FIG. 3 for the respective switching device.

In the invention described in FIG. 4, the setting means adjusts the voltage amplitude such that it increases when the discharge intensity of the dielectric barrier discharge lamp decreases as the control frequency drops. Therefore, the discharge intensity of the dielectric barrier discharge lamp can be kept in a stipulated range.

What is claimed is:

1. A light source device for a dielectric barrier discharge lamp which comprises:
    a dielectric barrier discharge lamp having a discharge space, said discharge space being filled with a discharge gas which produces excimers by a dielectric barrier discharge;
    first and second electrodes;
    a dielectric positioned between at least one of the first and second electrodes for inducing a discharge in the discharge gas; and
    a feed device for applying an essentially periodic AC high voltage to the first and second electrodes of the dielectric barrier discharge lamp,
    wherein the feed device includes a setting means for adjusting both the control frequency of the essentially periodic AC high voltage and the amplitude of the essentially periodic AC high voltage in accordance with a set control frequency.

2. A light source device for a dielectric barrier discharge lamp which comprises:
    a dielectric barrier discharge lamp having a discharge space, said discharge space being filled with a discharge gas which produces excimers by a dielectric barrier discharge:
    first and second electrodes;
    a dielectric positioned between at least one of the first and second electrodes for inducing a discharge in the discharge gas; and
    a feed device for applying an essentially periodic AC high voltage to the first and second electrodes of the dielectric barrier discharge lamp,
    wherein the feed device includes a setting means for adjusting both the control frequency of the essentially periodic AC high voltage and the amplitude of the essentially periodic AC high voltage in accordance with a set control frequency;
    wherein the feed device comprises a power source, a voltage controller including a switching device for controlling the feed voltage from the power source, an inverter including a pair of switching devices, said inverter being triggered by the feed voltage controlled by the voltage controller, an inverter switching device driver signal generating means for producing signals for driving the switching devices of the inverter, a voltage control switching device driver signal generating means for producing a signal for driving the switching device of the voltage controller, and a setting means.

3. The light source device as claimed in claim 2, wherein the setting means is adapted to output both a set inverter control frequency signal to the inverter switching device driver signal generating means to set the control frequency of the inverter, and a voltage setting signal to the voltage control switching device driver signal generating means to adjust the driving conditions of the switching device of the voltage controller, thereby adjusting the amplitude of the essentially periodic AC high voltage output in accordance with the set control frequency.

4. The light source device as claimed in claim 3, wherein the setting means includes a look-up table adapted to output correct data of a voltage setting signal, the data of the inverter control frequency setting signal being called addresses.

5. The light source device as claimed in claim 4, wherein the setting means is adapted to adjust the voltage amplitude as the control frequency drops such that the voltage amplitude increases when the discharge intensity of the dielectric barrier discharge lamp decreases.

* * * * *